(12) United States Patent
Kameyama

(10) Patent No.: US 7,006,621 B1
(45) Date of Patent: Feb. 28, 2006

(54) PORTABLE TELEPHONE TERMINAL WITH TOLL NUMBER RETRIEVAL FUNCTION

(75) Inventor: Hidehiko Kameyama, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/276,807

(22) Filed: Mar. 26, 1999

(30) Foreign Application Priority Data

Mar. 31, 1998 (JP) .................................. 10/104102

(51) Int. Cl.
*H04M 3/00* (2006.01)

(52) U.S. Cl. ........................... 379/355.02; 379/355.05; 379/356.01

(58) Field of Classification Search ................ 379/354, 379/355.01, 355.02, 355.04, 355.05, 356.01; 455/551, 564

See application file for complete search history.

(56) References Cited

U.S. PATENT DOCUMENTS 5,675,630 A * 10/1997 Beatty .................... 379/355.05

6,504,925 B1 * 1/2003 Schlachman et al. ....... 379/354

FOREIGN PATENT DOCUMENTS

| JP | HEI 9-64960 | 3/1997 |
|----|----|----|
| JP | HEI 9-172480 | 6/1997 |

* cited by examiner

*Primary Examiner*—Jefferey F. Harold
(74) *Attorney, Agent, or Firm*—Whitham, Curtis & Christofferson, PC

(57) ABSTRACT

A portable telephone terminal with toll number retrieval function which enable either corresponding name of municipalities or toll number to be retrieved to telephone number or to name of municipalities respectively. The portable telephone terminal is provided with a state discrimination means for discriminating whether an information inputted from an input means is a toll number or a name of municipalities in accordance with a mode which is set either a dialing mode or a character input mode, a storage section for storing therein data of name of municipalities and toll number, a retrieval means when the toll number is inputted, retrieving name of municipalities from the storage section, while when the name of municipalities is inputted, retrieving a toll number from the storage section, and a display means for displaying data which is retrieved.

8 Claims, 2 Drawing Sheets

PORTABLE TELEPHONE TERMINAL WITH TOLL NUMBER RETRIEVAL FUNCTION

BACKGROUND OF THE INVENTION

The present invention relates to a portable telephone terminal device. More particularly, this invention relates to a portable telephone terminal device with toll number retrieval.

DESCRIPTION OF THE PRIOR ART

Usually, when a caller performs a toll call using a portable telephone, the caller dials a local number after the toll number of the receiving party. For that reason, the caller, must obtain a toll number to be dialed from a telephone directory or a guide service of a toll number.

However, when the caller performs a toll call using a conventional portable telephone, time is required for searching for a toll number to dial, and adds further time and cost.

Japanese Patent Application Laid-Open No. HEI 9-172480 discloses "PORTABLE TELEPHONE". With place name information including principal communication partners' address and toll number, which is stored in RAM (Random Access Memory). When the user inputs the place name information (for instance YOKOHAMA) by using a keyboard to perform a toll call, the toll number ("045") corresponding to the place name is displayed on the display means such as LCD (Liquid Crystal Display Device) and so forth.

Moreover, Japanese Patent Application Laid-Open No. HEI 9-64960 discloses a TELEPHONE NUMBER DISPLAY METHOD AND DEVICE in which the telephone number and its related information are stored in the telephone number table of the telephone as data, and the data is displayed as needed.

SUMMARY OF THE INVENTION

In view of the foregoing, it is an object of the present invention, in order to overcome the above-mentioned problem, to provide a portable telephone terminal with toll number retrieval function in which, in a portable telephone capable of inputting and displaying character, there is a function for retrieving the names of municipalities or toll numbers from a telephone number or municipalities inputted beforehand.

According to a first aspect of the present invention, in order to achieve the above-mentioned object, there is provided a portable telephone terminal device which comprises a storage section for storing therein the name of municipalities and corresponding toll numbers, a means for retrieving the name of municipalities from the storage section according to the toll number inputted from an input means, and a means for displaying the name of municipalities.

According to a second aspect of the present invention, there is provided a portable telephone terminal device, which further comprises, a means for retrieving a toll number from the storage section, according to the name of municipalities inputted from the input means, and a means for displaying the toll number which is retrieved.

According to a third aspect of the present invention, there is provided a portable telephone terminal device which comprises a state discrimination means for discriminating whether information inputted from an input means is a toll number or a name of municipalities, a storage means for storing data of name of municipalities and toll number, a retrieval means, for retrieving toll numbers or names of municipalities according to entered data inputted from input means and a display means for displaying data which is retrieved.

According to a fourth aspect of the present invention, there is provided a portable telephone terminal device, wherein it is selected whether he or she inputs a toll number or the name of a municipality from the input means by the fact that he or she sets the input means to a dialing mode or a character input mode respectively, and the state discrimination means discriminates whether information inputted from the input means is a toll number or the name of a municipality while detecting this mode.

According to a fifth aspect of the present invention, there is provided a portable telephone terminal device, wherein when a predetermined retrieval key is pressed down in the input means, the retrieval means starts retrieval of the storage section with input information as a retrieval key, while until the retrieval key is pressed down, there is implemented input and editing of numerals or a character code from the input means.

According to a sixth aspect of the present invention, there is provided a portable telephone terminal device, wherein when the retrieval means implements the retrieval of the name of a municipality, the retrieval means retrieves the name of a municipality from a telephone number stored in a call history containing incoming and outgoing calls and/or from a telephone number stored in a re-dialing function.

According to a seventh aspect of the present invention, there is provided a storage medium storing therein a program for executing respective steps (a) to (d) by means of a computer of a portable telephone, which comprises the steps of:

(a) discriminating whether information inputted by an input means is a toll number or the name of a municipality, while detecting mode of the input means which is set either as a dialing mode or a character input mode in accordance with the fact that a retrieval is performed by either a toll number or the name of a municipality, (b) retrieving the name of a municipality corresponding to an inputted toll number from a storage section for storing therein data of the name of a municipality and toll numbers, when there is judged that a toll number is inputted from the input means, at the case where pressing down of predetermined retrieval key by the input means is detected to input the toll number, (c) retrieving a toll number corresponding to an inputted name of a municipality from a storage section storing therein data of the names of municipalities and toll numbers, when there is judged that the name of a municipality is inputted from the input means, at the case where pressing down of predetermined retrieval key by the input means is detected to input the name of a municipality, and (d) controlling so as to display retrieved data to a display output device.

CONFIGURATION OF ENFORCEMENT OF THE INVENTION

In the desirable configuration of the invention of a portable telephone, referring to FIG. 1, there is provided an input means (1), a state discrimination means (2) for discriminating whether information inputted from the input means (1) is a telephone number (toll 5 number) or the name of a municipality, a storage section (4) for storing the name of municipalities and the corresponding toll numbers, a retrieval means (3), means for retrieving the name of a municipality from the storage section (4) when a telephone number is inputted from the input means (1), means for retrieving the telephone number corresponding to the inputted name of a municipality from the storage section (4), and a display means (5) for displaying data which is retrieved.

In the desirable configuration of the enforcement, when information inputted from the input means (1) is a toll number, a dialing mode is set, when information is the name of a municipality, a character input mode is set. The state discrimination means (2) discriminates whether the information inputted from the input means (1) is the toll number or the name of a municipality while detecting this mode.

In the desirable configuration of the enforcement, when a predetermined retrieval key is pressed down in the input means (1), the retrieval means (3) starts retrieval of the storage section (4) with an input information as a retrieval key, while until the retrieval key is pressed down, input and editing of numerals and character code from the input means (1) are implemented.

In the desirable configuration of the enforcement, the retrieval means (3) implements, at the time of retrieval of the name of municipalities, retrieval of telephone number from a telephone number stored in terminating history function for storing therein telephone number of an incoming call, or from a telephone number stored in re-dialing function.

In the desirable configuration of the enforcement, following each step (a) to (d) can be realized by a program which is executed in the processing elements (computer) of the control section (10). The program is stored in a storage medium such as ROM (Read Only Memory), Memory Card and so forth. The content of the storage medium is loaded on a memory such as RAM and so forth, thus being executed on the computer.

(a) discriminating whether an information inputted from the input means is a toll number or the name of a municipality, while detecting the mode of the input means (1), which is set as either a dialing mode or a character input mode in answer to either the retrival of a toll number or the name of a municipality;

(b) retrieving the name of a municipality corresponding to the inputted toll number from the storage section (4) storing therein data of the name of a municipality and corresponding toll number, thereto when it is found that the toll number is inputted from the input means (1) since the user inputs the toll number, continuously, the user presses down a predetermined retrieval key;

(c) retrieving the toll number corresponding to the inputted name of a municipality from the storage section (4), storing therein data of the name of a municipality and corresponding toll number, thereto when there is discriminated that the name of municipalities is inputted from the input means (1) since the user inputs the name of municipalities, continuously, the presses down a predetermined retrieval key; and (d) controlling so as to display the retrieved data on a display device (5).

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

Figure 1:
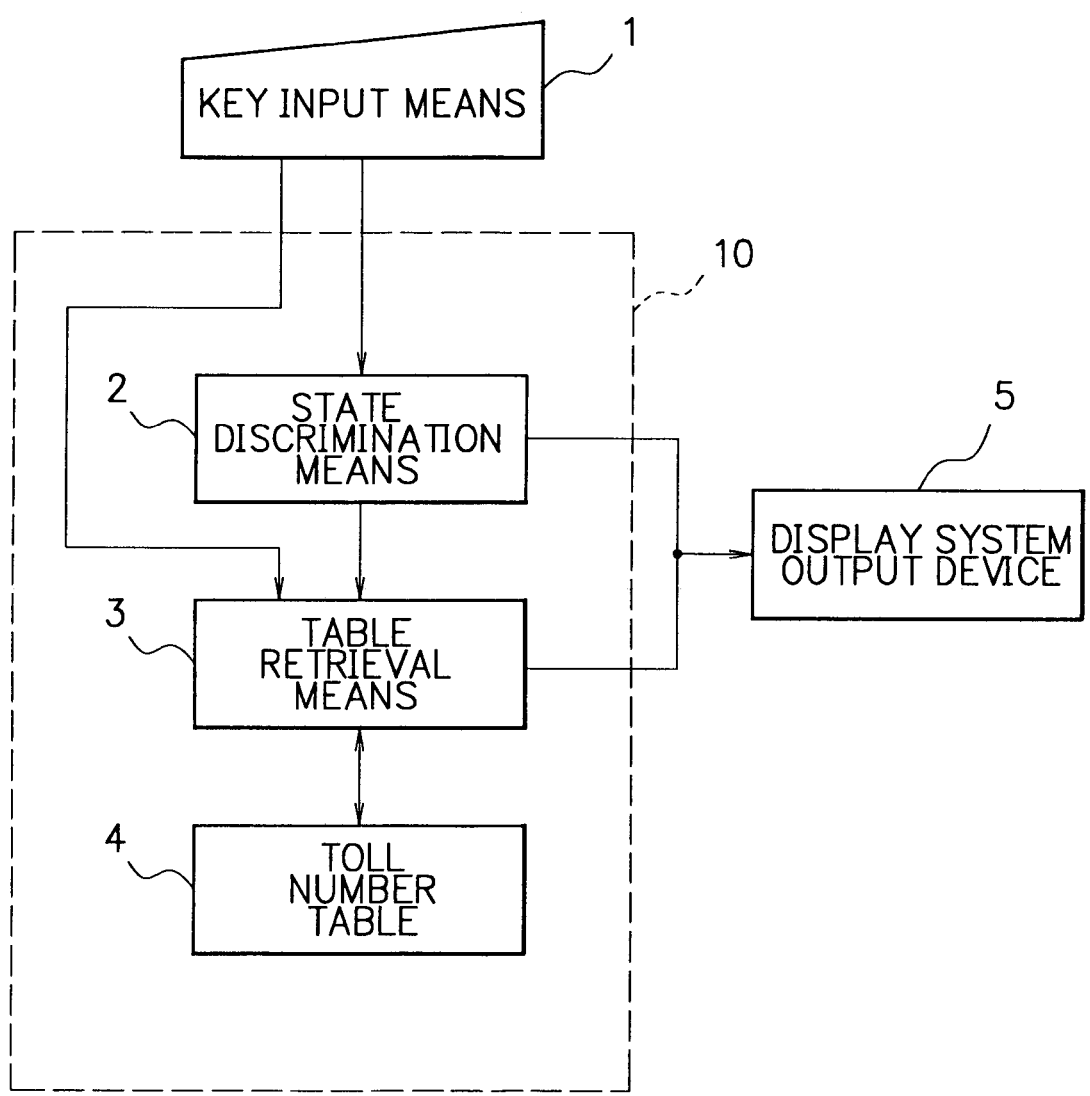
FIG. 1 is a view showing a configuration of an embodiment of the present invention.

A preferred embodiment of the present invention will be described in accordance with the accompanying drawings. FIG. 1 is a view showing a configuration of an embodiment of the present invention. Referring to FIG. 1, a portable telephone terminal with a toll number retrieval function of the present embodiment comprises a key input means 1 for inputting characters and numerals such as telephone numbers and names of municipalities and so forth, a control section 10 for performing retrieval processing and so forth due to program control, and a display system output device 5 displaying data retrieved by the control section 10.

The control section 10 is provided with a state discrimination means 2 for discriminating whether a character string inputted by the key input means 1 is a telephone number (toll number) or the name of a municipality, a toll number table 4 in which the names of municipalities or toll numbers is stored therein, and a 4 in which the names of municipalities or toll numbers is stored therein, and a table retrieval means for retrieving data of the names of municipalities or toll numbers stored in the toll number table 4.

Figure 2:
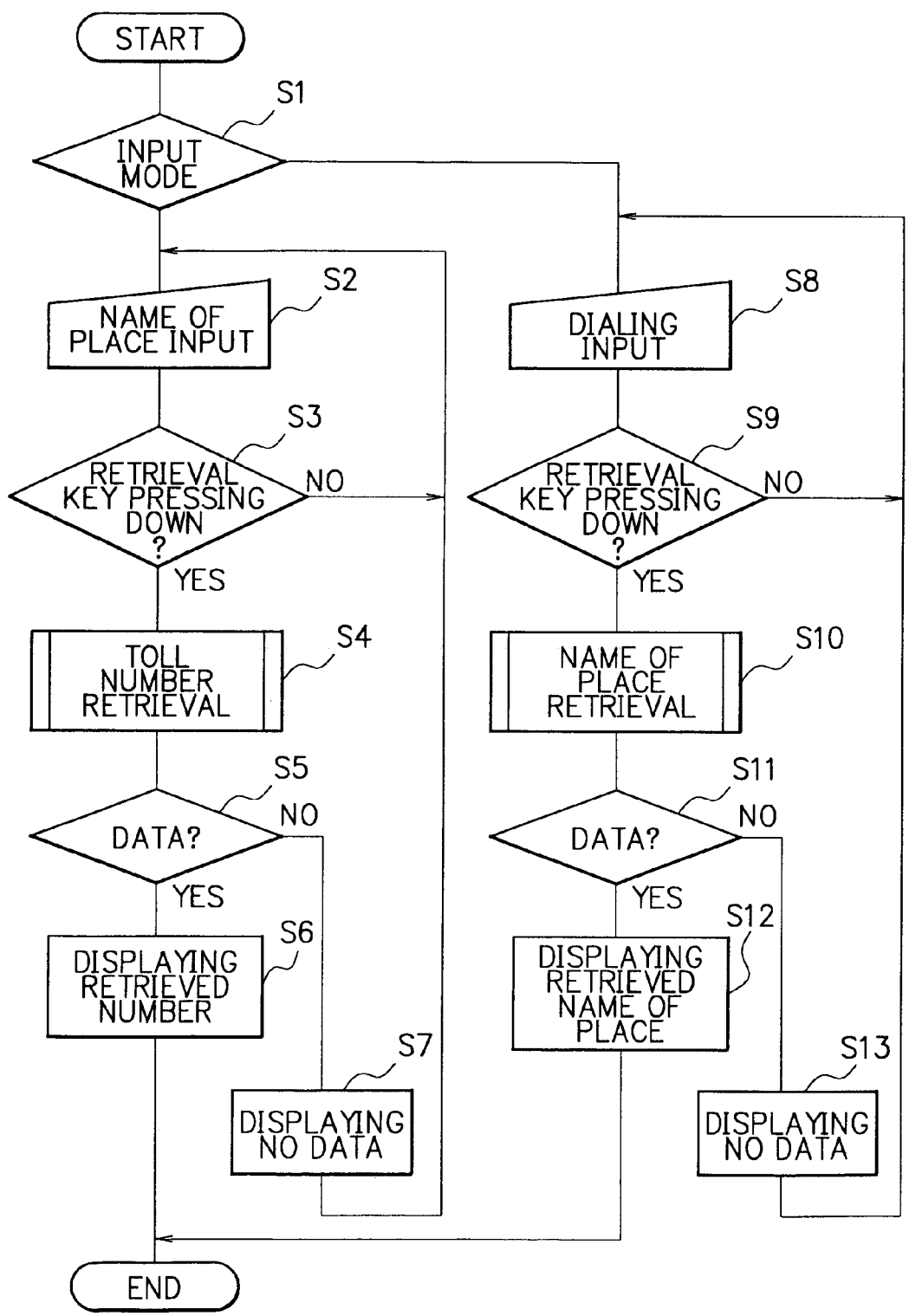
FIG. 2 is a flowchart showing a processing flow of the embodiment of the present invention.

FIG. 2 is a flowchart for explaining a processing flow of the embodiment of the present invention, that is, a view showing flowchart of a program incorporated in the control section 10. There will be described operation of the present embodiment of the invention referring to FIGS. 1 and 2.

The user of the portable telephone selects whether he retrieves a toll number or he retrieves a name of municipalities by using the key input means 1.

When the user retrieves a toll number, the user inputs the name of a municipality of the object (name of place) by setting a character input mode by the key input means 1 (STEP S1, S2).

When the input of the name of municipalities is completed, the user inputs a retrieval key predetermined beforehand, which is provided for the sake of retrieval at the key input means 1.

In STEP S3, it is judged whether or not the retrieval key is pressed down. The present invention is capable of performing input of characters and correction thereof by using the key input means 1 until the retrieval key is pressed down.

When it is recognized that the retrieval key is pressed down (YES branch of STEP S3), there is implemented retrieval of the toll number (STEP S4).

When corresponding toll number is retrieved (YES branch of STEP S5), there is displayed the toll number retrieved beforehand by the display system output device 5 (STEP S6). On the other hand, when the corresponding toll number is not retrieved in the toll number retrieval processing of STEP S4 (NO branch of STEP S5), there is displayed the matter that there is no corresponding data to the display system output device 5 (STEP S7), thus returning to input state of the name of a municipality, again (STEP S2).

Furthermore, when the user retrieves the name of a place, the user inputs the toll number of the object while setting a dialing input mode by using the key input means I in order to input the toll number (STEP S1, S8).

When the input of the toll number is completed, the user inputs the retrieval key predetermined beforehand, which is provided for the key input means 1 for retrieval. In STEP S9, there is judged whether or not the retrieval key is pressed down. It is capable of being performed input and correction of the toll number until when the retrieval key is pressed down (NO branch of STEP S9).

When there is recognized that the retrieval key is pressed down (YES branch of STEP S9), the retrieval of the name of municipalities is implemented (STEP S10). The portable telephone terminal with toll number retrieval function is constituted that, at this time, it is capable of retrieving the name of a municipality from a telephone number stored in function (terminating history) for storing telephone number of a call originating side at the time of terminating, or a telephone number stored in redialing function.

When the corresponding name of municipalities is retrieved (YES branch of STEP S11), there is displayed the whole name of the municipality retrieved beforehand to the display system output device 5 (STEP S12). On the other hand, if the corresponding name of municipalities is not retrieved (NO branch of STEP S11), there is displayed that there is no corresponding data therein, on the display system output device 5 (STEP S13), thus returning to input state of a toll number again (STEP S8).

Hereinafter, there will be described the processing of a retrieval of the toll number (0495) of Kamikawa Machi (Saitama Prefecture) by way of a retrieval of a toll number. The user inputs Kamikawa Machi while setting a character input mode by using the key input means 1 in order to input Kamikawa Machi (STEP S1, S2). The retrieval of the toll number is implemented while pressing down the retrieval key after inputting (STEP S3, S4). When the toll number (0495) of Kamikawa Machi is retrieved, (0495) is displayed on the display system output device 5 (STEP S5, S6).

On the other hand, when the toll number can not be retrieved caused by an error of character input or the like, displaying on the display output device that there is no corresponding data therein, thus returning to character input screen again, subsequently, retrieval is implemented again after correction of character input (STEP S5, S7, S2).

Next, there will be described processing for retrieving corresponding name of municipalities to (0492) by way of retrieval of a name of municipalities. At this case, the user inputs (0492) while setting mode to dialing input mode by using the key input means 1 in order to input (0492) (STEP S1, S8). There is implemented the retrieval of the name of municipalities while pressing down the retrieval key after dialing input (STEP S9, S10). Then, when the corresponding name of municipalities to (0492) is retrieved, displaying the whole corresponding names of municipalities on the display system output device 5 (STEP S11, S12).

On the other hand, the corresponding name of municipalities can not be retrieved caused by an error of dialing input or the like, there is displayed on the display system out put device 5 that there is no corresponding data, thus returning to the dialing input screen again, subsequently, retrieving again after correction of the error (STEP S11, S13, S8).

The portable telephone of the present embodiment is suitable for use in the case where when the user makes a journey and the user intends to hear a weather forecast for the end destination of his journey.

There will be described another embodiment of the present invention. When the function of postal code discrimination, which is used in a post office, is utilized in the toll number retrieval of the present invention, it is capable of a postal code retrieval function.

As described above, according to the present invention, when a toll number is unknown although the exchange code is known, the user can obtain the toll number immediately, thus there is the effect that serviceable characteristic of the portable telephone is improved.

Furthermore, according to the present invention, since it is capable of retrieving numbers from a terminating history or a redialing function, the user can retrieve the place where the communication partner performed a call and an area to which the partner makes a telephone call.

While preferred embodiments of the invention have been described using specific terms, such description is for illustrative purpose only, and it is to be understood that changes and variations may be made without departing from the spirit or scope of the following claims.

What is claimed is:

1. A portable telephone terminal device comprising:
   a storage section for storing therein a name of municipalities and a corresponding toll number thereto;
   a means for retrieving said name of municipalities from said storage section, while being taken, said toll number being inputted from an input means to be a retrieval key;
   a means for displaying the name of municipalities which is retrieved.

2. A portable telephone terminal device as claimed in claim 1, further comprising:
   a means for retrieving said toll number from said storage section while being taken the name of municipalities inputted from said input means to be a retrieval key; and
   a means for displaying the toll number which is retrieved.

3. A portable telephone terminal device comprising:
   a state discrimination means for discriminating whether an information inputted from an input means is a toll number or a name of municipalities;
   a storage section for storing data of a name of municipalities and corresponding toll number thereto;
   a retrieval means, when the toll number is inputted from said input means, for retrieving corresponding name of municipalities to said toll number for said storage section, while when the name of municipalities is inputted from said input means, said retrieval means retrieves corresponding toll number to said name of municipalities from said storage section; and
   a display means for displaying data which is retrieved.

4. A portable telephone terminal device as claimed in claim 3, wherein it is selected whether he or she inputs a toll number or a name of municipalities from said input means by the fact that he or she sets said input means to a dialing mode or a character input mode respectively, and said state discrimination means discriminates whether an information inputted from said input means is a toll number or a name of municipalities, while detecting the mode.

5. A portable telephone terminal device as claimed in claim 3, wherein a predetermined retrieval key is pressed down in said input means, said retrieval means starts retrieval of said storage section with an input information as a retrieval key, while until said retrieval key is pressed down, there is a implemented input and editing of numerals or a character code.

6. A portable telephone device as claimed in claim 3, wherein when said retrieval means implements retrieval of a name of municipalities, said retrieval means retrieves name of municipalities from telephone number stored in a terminating history function section for storing therein telephone number of a call originating side at the time of terminating and/or from telephone number stored in a redialing function.

7. A storage medium for storing therein a program for executing respective processing (a) to (e) by a computer of a portable telephone comprising the computing steps of:
  (a) discriminating whether an information inputted by an input means in a toll number or a name or municipalities, while detecting mode of said input means which is set as either a dialing mode or a character input mode in accordance with the fact that a retrieval is performed by either a toll number or a name of municipalities;
  (b) for retrieving data of corresponding name of municipalities to an inputted toll number from a storage section for storage therein data of name of municipalities and toll number when there is judged that a toll number is inputted from said input means, at the case where pressing down of predetermined retrieval key in said input means is detected continuously to input of said toll number;
  (c) retrieving data of corresponding toll number to an inputted name of municipalities from a storage section for storing therein data of name of municipalities and toll number when there is judged that a name of municipalities is inputted from said input means, at the case where pressing down of predetermined retrieval key in said input means is detected continuously to input of said name of municipalities;
  (d) controlling said display device to display said retrieved data; and
  (e) displaying on said displaying means said information inputted by said input means in the event of failed retrieval operation, to be edited by said inputting means.

8. A portable telephone terminal device as claimed in claim 3 further comprising:
  a storage section for storing therein a postal area code and a corresponding toll number thereto;
  a means for retrieving said toll number from said storage section while being taken said area code is inputted from said inputting means; and
  a means for displaying the toll number which is retrieved.

* * * * *